United States Patent [19]

Karlsson

[11] Patent Number: 4,515,326
[45] Date of Patent: May 7, 1985

[54] ARRANGEMENT FOR LOCKING THE WINDING DEVICE OF A VEHICLE SAFETY-BELT

[76] Inventor: Hans I. R. Karlsson, Vintervägen 17, S-175 40 Järfälla, Sweden

[21] Appl. No.: 526,361

[22] Filed: Aug. 25, 1983

[30] Foreign Application Priority Data

Sep. 13, 1982 [SE] Sweden .................. 8205212

[51] Int. Cl.³ .................. A62B 35/02; B65H 75/48
[52] U.S. Cl. .................. 242/107.4 A; 242/107.4 B
[58] Field of Search .................. 242/107.4 A, 107.4 B; 280/806; 297/478, 480

[56] References Cited

U.S. PATENT DOCUMENTS

| | | | |
|---|---|---|---|
| 3,402,899 | 9/1968 | Wright, Jr. et al. | 242/107.4 B |
| 3,478,981 | 11/1969 | Barecki et al. | 242/107.4 B |
| 4,065,071 | 12/1977 | Holmberg | 242/107.4 A |
| 4,148,447 | 4/1979 | Lindblad | 242/107.4 A |

FOREIGN PATENT DOCUMENTS

| | | | |
|---|---|---|---|
| 240325 | 5/1960 | Australia | 242/107.4 B |
| 209732 | 12/1966 | Sweden | 242/107.4 B |
| 1029156 | 5/1966 | United Kingdom | 242/107.4 A |

*Primary Examiner*—John M. Jillions
*Attorney, Agent, or Firm*—Browdy and Neimark

[57] ABSTRACT

The invention relates to an automatically operating locking arrangement for the winding device of a vehicle safety-belt, the winding device including a spindle (4) which is journalled for rotation in two mutually opposite directions and to which there is connected a strap (5) which forms part of the safety belt and which can be wound onto and unwound from the spindle, the spindle being connected to a spring (6) which is tensioned when the strap is unwound from the spindle and which is able to drive the spindle in the opposite direction, for automatically winding up the strap. The locking arrangement (9) according to the invention is arranged to lock the spindle (4) automatically against rotation in the strap-unwinding direction, when the vehicle in which the winding device is installed is subjected to acceleration or retardation forces exceeding a given value, for example as a result of collison, heavy braking or the like. The locking arrangement can also be designed to automatically lock the spindle against rotation in the strap-unwinding direction, when the strap is unwound at an excessively high acceleration or an excessively high speed (FIG. 1).

16 Claims, 15 Drawing Figures

ARRANGEMENT FOR LOCKING THE WINDING DEVICE OF A VEHICLE SAFETY-BELT

The present invention relates to a locking arrangement for locking the winding device of a vehicle safety-belt or safety-harness. In principle, an automatically operating winding device for vehicle safety-belts comprises a spindle which is journalled for rotation in two, mutually opposite directions. A safety-belt strap is connected to the spindle in a manner which enables the strap to be wound onto and unwound from the spindle, and the spindle is connected to a spring means which is placed under tension as the spindle rotates in the unwinding direction, i.e. when the safety-belt is extended or pulled out and which drives the spindle in the opposite direction, to wind the strap onto the spindle, i.e. to automatically retract or pull in the safety belt, when the belt is not subjected to any belt-extending force. In this way, the belt is constantly held in comfortable abutment with the belt wearer, and is automatically drawn into a rest position when not in use.

A primary requirement of such a winding device is that the spindle is automatically locked against rotation in an unwinding direction, i.e. in a direction in which the belt is drawn out, if the vehicle is subjected to acceleration or retardation forces which exceed a given smallest value, such as when the vehicle is involved in a collision for example, when the vehicle is braked suddenly and heavily, or in the case of other exagerated changes in speed or direction. If the spindle fails to lock automatically, the safety belt is unable to fulfill its safety function. At the same time, however, it must be readily possible to pull out the safety belt from the winding device at a moderate speed, so that the belt can be placed around the wearer and so that it will readily follow the normal movements of the wearer.

A number of different locking arrangements for this purpose are known to the art. One such known locking arrangement, which is widely used today, is found described, for example, in US Pat. No. 3,758,044. In practice, however, this locking arrangement, as indeed other known locking arrangements intended for the aforesaid purpose, has been found relatively complicated, and therewith relatively expensive to manufacture. In addition, these locking arrangements are relatively bulky.

Another disadvantage with these known locking arrangements is that they will only function under the influence of acceleration and retardation forces which affect the actual vehicle in which the device is installed. Generally, however, safety-belt winding devices are also required to lock automatically against extraction or extension of the belt, not only when the actual vehicle is affected by large acceleration or retardation forces, but also in the absence of such acceleration or retardation forces if, for some reason or other, the safety belt should begin to be pulled out or extracted at a rate of speed change, i.e. an acceleration, which exceeds a given limit value, or pulled out at an excessive speed, even though the acceleration at which the belt is pulled out lies beneath said limit value. It is considered that through these additional locking functions applicable to the extension of a safety belt, there is obtained an assurance that the safety belt will fulfill its safety function still more positively. Known locking arrangements of the aforesaid kind, however, do not function under the influence of the belt-unwinding speed or belt-unwinding acceleration, but only under the influence of the acceleration or retardation forces which act upon the vehicle in which the winding device is stalled. Consequently, it has been necessary hitherto to provide such safety-belt winding devices with separate latching or locking-mechanisms which react to the speed or acceleration at which the belt is extended. This further complicates the known winding devices and renders them still more expensive. In addition, their dimensions become larger.

Consequently, it is an object of the present invention to provide a locking arrangement of the aforementioned kind which can be manufactured simply and at relatively low cost; which requires but relatively small space; and which will automatically lock the spindle in a belt-extending direction, not only when the vehicle in which the winding device is installed is affected by acceleration and retardation forces, but which can also be designed to lock the spindle automatically against rotation in said belt-extending direction, when the belt-extending speed or belt-extending acceleration tends to exceed given limit values.

The characterizing features of a locking arrangement according to the invention are set forth in the accompanying claims.

Exemplary embodiments of a locking arrangement according to the invention will now be described in detail with reference to the accompanying drawing, in which.

Figure 1:
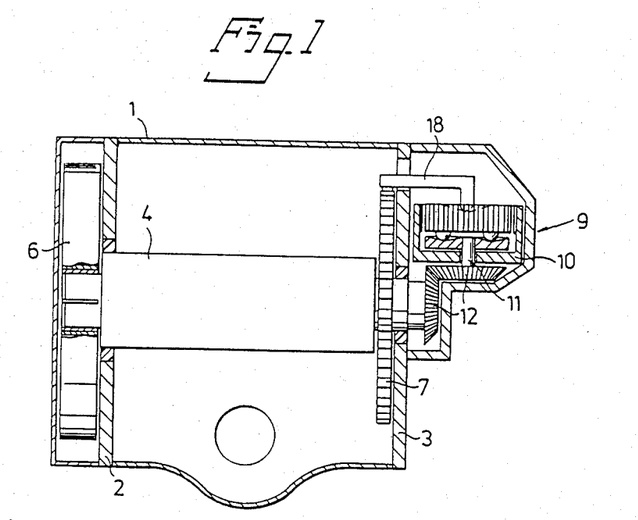
FIG. 1 is a schematic side view, partly in section, of a first embodiment of a winding device provided with a locking arrangement according to the invention.
Figure 2:
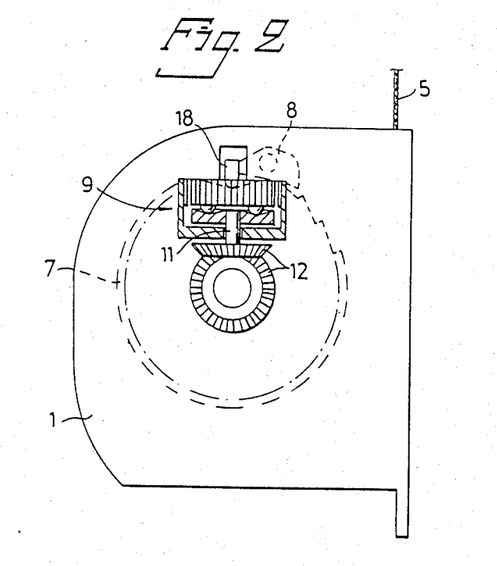
FIG. 2 is an end view, partly in cross section, of the winding device illustrated in FIG. 1.

The safety-belt winding device illustrated schematically by way of example in FIGS. 1 and 2 includes a housing 1 having two end walls 2 and 3 in which a spindle 4 is journalled for rotation in two mutually opposite directions. One end of a strap 5 associated with the safety-belt is attached to the spindle 4, so that the strap can be wound onto and unwound from the spindle 4 when the spindle rotates in the appropriate direction. One end of the spindle 4 is connected to a coil spring 6, which is tensioned when the spindle 4 is rotated in the strap-unwinding direction. The strap 5 is unwound by means of a traction force applied thereto. When this traction force is removed, the strap 5 is automatically re-wound onto the spindle 4 through the restoring forces exerted by the spring 6, said spring being tensioned as the strap was unwound.

For the purpose of locking the spindle 4 against rotation in the strap-unwinding direction, i.e. against further extension of the safety belt, there is fixedly mounted on the other end of the spindle 4 a ratchet wheel 7 in which a pivotable pawl 8 can engage. The teeth on the ratchet 7 are so arranged that the pawl 8 can only prevent rotation of the spindle 4 in the belt-unwinding direction, but not in the winding direction.

The pawl 8 can be swung into engagement with the ratchet 7 by means of a locking arrangement according to the invention located externally of the end wall 3 of the housing, this locking arrangement being referenced 9 in FIGS. 1 and 2. The locking arrangement 9 is enclosed in a housing 10, and includes a shaft 11 which is journalled in said housing for rotation in two, mutually opposite directions, the shaft 11 of the illustrated winding device being coupled to the spindle 4 via a mitre-wheel gear 12. Thus, the shaft 11 will rotate together with the spindle 4. The locking arrangement 9 is so mounted on the housing 1 that the shaft 11 is substantially vertical in the intended mounting position of the winding device.

Figure 3:
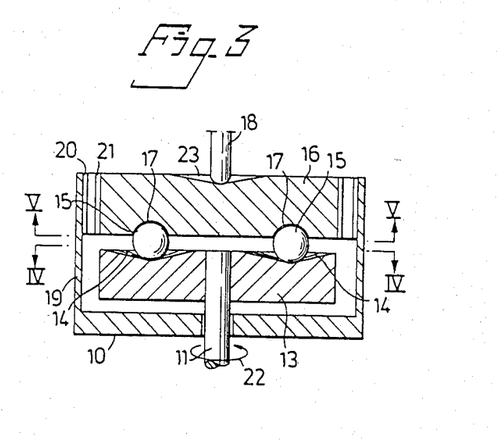
FIG. 3 is a schematic axial sectional view of the functionally essential components of a first embodiment of a locking arrangement according to the invention.
Figure 4:
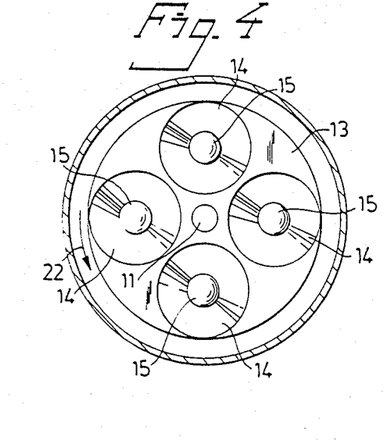
FIG. 4 is a sectional view along line IV—IV in FIG. 3, showing in plan view a body which rotates together with the spindle in the locking arrangement illustrated in FIG. 3.

FIGS. 3-4 illustrate a first embodiment of the locking arragement 9 according to the invention. The illustrated locking arrangement includes a circular plate 13 which is fixedly mounted on the upper end of the shaft 11 geared to the spindle 4 and rotating together therewith, and the upper side of which plate extends at right angles to the shaft 11, and is thus positioned horizontally in the intended mounting position of the winding device provided with the locking arrangement. The upper surface of the plate 13 is provided with a plurality of recesses 14 arranged symmetrically in relation to the rotary axis of the plate. In the illustrated embodiment, four such recesses 14 are provided. Each such recess is substantially circular and has a depth which decreases gradually in all directions from the centre of the recess. A spherical ball 15 is freely arranged in each of said recesses, the ball having a diameter which substantially exceeds the greatest depth of the recess. Resting upon the balls 15 is a circularcylindrical inertia body 16 which is freely moveable in all directions and the lower surface of which is provided with a part-spherical hollow 17 for each of the balls 15. The inertia body 16 thus rests on the plate 13, via the balls 15, under the action of its own weight and under the action of an abutment pressure exerted by a pivot arm 18 which abuts the upper surface of the inertia body 16 and which is connected to the aforementioned pawl 8 (see FIGS. 1 and 2). Arranged co-axially around, and at some distance from the inertia body 16 is a cylindrical wall 19 which forms part of the stationary housing 10, said housing being of cup-shaped configuration and enclosing the moveable parts of the locking arrangement. The cylindrical outer surface of the inertia body 16 is provided with teeth 21, while the inner surface of the stationary cylindrical wall 19 is provided, in a corresponding manner, with teeth 20. For the sake of simplicity, the teeth 20 and 21 are only shown in part in FIG. 5. The teeth are formed so as to mesh with each other and prevent rotation of the inertia body 16 in the rotary direction of the shaft 11 and the plate 13 corresponding to an unwinding of the strap 5 from the spindle 4, when the inertia body 16 is displaced laterally to an extent at which its outer cylindrical surface comes into contact with the inner surface of the stationary cylindrical wall 19. The rotary direction of the shaft 11 and plate 13 corresponding to an unwinding of the strap 5 from the spindle 4 is marked by means of arrows 22 in FIGS. 3–5.

Figure 5:
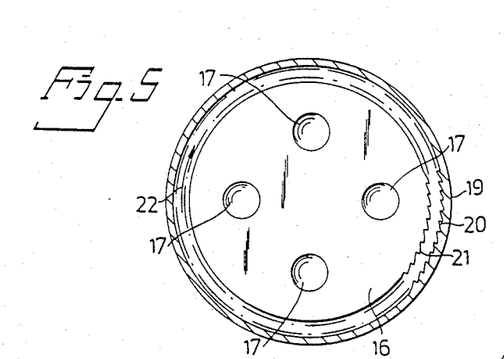
FIG. 5 is a sectional view along line V—V in FIG. 3, showing in plan view an inertia body in the locking arrangement illustrated in FIG. 3.

The inertia body 16 will remain in the neutral position illustrated in FIGS. 3 and 5, co-axial with the plate 13, provided that the vehicle in which the winding device is installed is not subjected to acceleration or retardation forces exceeding a given limit value, and provided that the strap 5 is not unwound from or wound onto the spindle 4 at a belt-acceleration exceeding a given limit value. The inertia body 16 is held in the neutral position by means of the balls 15, and is caused to accompany rotation of the plate 13 by said balls 15, when the strap 5 is unwound from the spindle 4 or wound thereonto. In the neutral position of the inertia body 16, the pivot arm 18 lying against the upper side of the inertia body is in a position such that the previously mentioned pawl 8 (see FIGS. 1 and 2) remains out of engagement with the ratchet wheel 7.

However, should the vehicle and therewith the locking arrangement be subjected to a large acceleration or retardation force, for example as a result of a collision or as a result of heavy braking or the like, said force having a component at right angles to the vertical shaft 11, the inertia body 16 will be displaced laterally under the influence of said force, so that the outer cylindrical surface of the body comes into contact with the inner surface of the stationary wall 19, causing the two sets of teeth 20 and 21 to mesh. As a result hereof, the inertia body 16 will be prevented from rotating in the rotary direction 22 corresponding to the direction in which the strap is unwound from the spindle 4. If the spindle 4 attempts to rotate in the strap-unwinding direction, as a result of a simultaneously occurring tension force in the strap 5, whereupon the plate 13 will rotate in direction 22, the inertia body 16 will consequently be unable to accompany said rotation, but will instead "lag behind". As a result of this lagging of the inertia body, the balls 15 will be forced to roll up the sloping sides of the recesses 14, causing the inertia body 16 to be lifted upwardly away from the plate 13. This lifting of the inertia body 16 is transmitted to the pawl 8 (see FIGS. 1 and 2) through the pivot arm 18, the pawl being swung into engagement with the ratchet wheel 7, so as to automatically lock the spindle 4 against rotation in the strap-unwinding direction. Thus, unwinding of the strap 5, and therewith extension of the safety belt, is blocked automatically when the vehcile is subjected to a strong acceleration or retardation force. Winding of the strap 5, i.e. tightening or retraction of the safety belt, is not prevented, however, since the teeth 20, 21 do not prevent rotation of the inertia body in the direction opposite to that indicated by arrow 22, and neither is the locking mechanism formed by the ratchet wall 7 and the pawl 8 capable of preventing rotation of the spindle 4 in the strap-winding direction.

As a result of the sloping sides of the recesses 14, the lateral displacement of the inertia body 16 in response to large acceleration or retardation forces, will already by itself cause the inertia body 16 to be lifted somewhat. Lifting of the pivot arm 18 when the inertia body 16 is moved laterally is further amplified in the embodiment illustrated in FIGS. 3-5, because the upper side of the inertia body 16 is provided with a central recess 23 having a depth which decreases gradually in all directions, in which recess the pivot arm 18 rests against the inertia body 16. The recess 23 also co-acts with the Pivot arm 18 in holding the inertia body centered in the neutral position illustrated in FIGS. 3 and 5, as a result of the force at which the pivot arm 18 abuts the inertia body 16. It will be understood, however, that in this way the pivot arm 18 will also counter-act to a certain extent the lateral movement of the inertia body 16. If, instead it is desired to make the inertia body 16 very easily moveable in the lateral direction, the upper side of the body can be made completely flat and the pivot arm 18 can be arranged so that, in the rest position of the inertia body 16, it lies slightly above, for example some tenths of a millimeter, the upper side of the inertia body 16, so as not to be able to brake the lateral movement of said body.

The limit value for the acceleration or retardation force capable of bringing the inertia body 16 into abutment withthecylinder 19 is primarily determined by the angle at which the sides of the recesses 14 are inclined, and by the weight of the inertia body 16. The sides of the recesses 14 need not have a constant angle of slope, but the slope may, for example, be steeper or more gentle in the proximity of the center of the recesses 14. In this way, different functional characteristics of the locking arrangement can be achieved. In particular, the recesses 14 can be provided in the center thereof with a small hollow in which the balls 15 rest in their rest position and from which the balls can only roll when subjected to forces exceeding a given limit value. These hollows, or pits, in the center of the recesses 14 can be produced with great accuracy, by drilling holes from the center of the recesses 14 to the undersurface of the plate 13.

The embodiment of the locking arrangement according to the invention illustrated in FIGS. 3-5 will also automatically lock the spindle 4 against rotation in the strap-unwinding direction, when the strap 5 tends to be unwound by an acceleration, i.e. an increase in speed, which exceeds a given limit value, even when the vehicle is not, simultaneously therewith, subjected to an acceleration or retardation force capable of displacing the inertia body 16 laterally into abutment with the stationary cylinder 19. If the shaft 11 and therewith the plate 13 accelerate strongly, the inertia body 16 is unable to accompany this accelerated movement, as a result of the inertia of said body, but will instead "lag behind". In this way, the balls 15 are caused to roll up the sloping sides of the recesses 14, whereupon the inertia body 16 is lifted and the pawl 8 is brought into engagement with the ratchet wheel 7 via the pivot arm 18.

As previously mentioned, with safety-belt winding devices it is often desirable for the spindle to be locked automatically against rotation in the strap-unwinding direction, should the strap begin to be extended or pulled out at a speed which exceeds a given limit value. This desideratum will not be fulfilled with the embodiment of the invention illustrated in FIGS. 3-5. With the embodiment of the invention illustrated in FIGS. 6 and 7, however, the spindle 4 will be automatically locked against rotation in the strap-unwinding direction, when the strap is unwound at a speed greater than a given limit value. This embodiment is similar to the aforedescribed embodiment illustrated in FIGS. 3-5, with the single, important difference that the part-spherical hollows or pits 17 in the inertia body 16 have been replaced with grooves 24 which extend radially out towards the periphery of the inertia body. If the spindle 4 begins to rotate at a high speed in the strap-unwinding direction, so that the shaft 11 and the plate 13 rotate at a high speed in the direction 22, the balls 15 will be forced to move, by the occurring centrifugal forces, radially outwardly in the grooves 24, and to roll up the sloping sides of the recesses 14. This also causes the inertia body 16 to be raised, so that the pivot arm 18 brings the pawl 8 into engagement with the ratchet wheel 7, thereby to automatically lock the spindle 4 against rotation in the strap-unwinding direction. As will be understood, the embodiment illustrated in FIGS. 6, 7, will, in other respects, function in the same manner as the aforedescribed embodiment illustrated in FIGS. 3-5. In the embodiment according to FIGS. 6,7, there is no recess for the pivot arm 18 in the upper surface of the inertia body 16, and hence the inertia body 16 is able to move laterally more easily under the influence of acceleration and retardation forces acting upon the vehicle.

Figure 6:
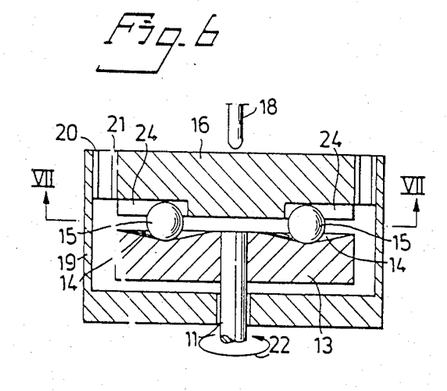
FIG. 6 is a schematic axial sectional view of a second embodiment of a locking arrangement according to the invention.
Figure 6A:
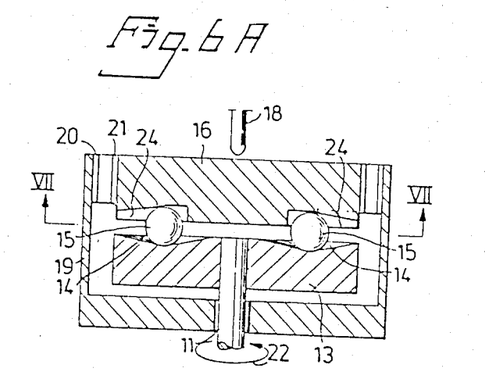
FIG. 6A is a schematic axial sectional view of a variation of the locking arrangement shown in FIG. 6.
Figure 7:
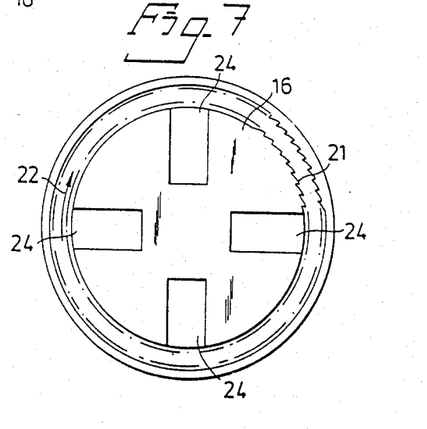
FIG. 7 is a sectional view along line VII—VII in FIG. 6, showing in plan view an inertia body in the locking arrangement illustrated in FIG. 6.

In the embodiment illustrated in FIGS. 6, 7, the grooves 24 have a constant depth over their entire lenghts. The depth of the grooves, however, may also be made to decrease gradually in a direction towards the periphery of the inertia body 16 as illustrated in FIG. 6A. This will result in a larger axial lift of the inertia body 16, when the balls 15 move radially outwardly in the grooves 24 under the influence of the centrifugal forces which occur. The balls 15 are prevented from being thrown completely from the grooves 24 by the stationary cylindrical wall 19. The grooves 24 may have a semi-circular or rectangular cross-sectional shape, adapted to the diameter of the balls 15. The grooves 24, however, may also have a V-shaped cross-section, with sloping sides, up which the balls 15 are able to roll in the function of the locking arrangement. This will further increase the axial movement of the inertia body 16.

Figure 8:
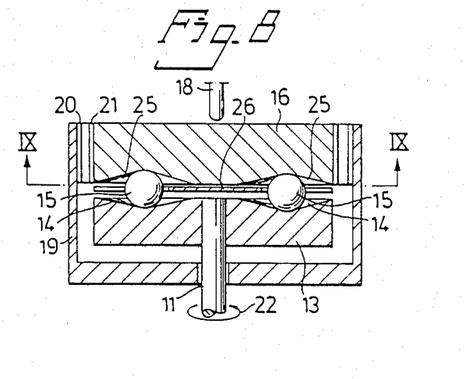
FIG. 8 is a schematic axial sectional view of a third embodiment of a locking arrangement according to the invention.
Figure 9:
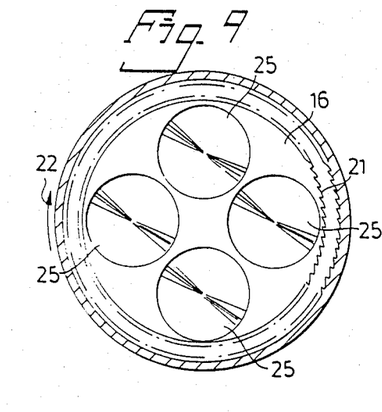
FIG. 9 is a sectional view along line IX—IX in FIG. 8, showing in plan view an inertia body in the locking arrangement illustrated in FIG. 8.
Figure 10:
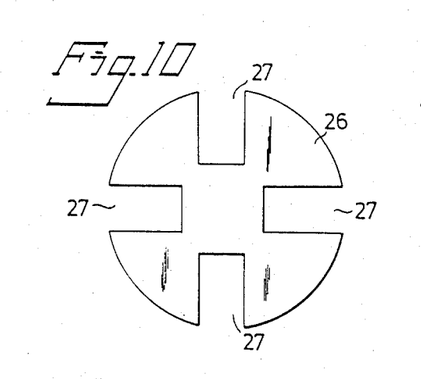
FIG. 10 is a plan view of a ball-holder plate in the locking arrangement illustrated in FIG. 8.

A particularly advantageous embodiment of the locking arrangement according to the invention is illustrated in FIGS. 8-10. This embodiment differs from the aforedescribed embodiments, in that the inertia body 16 is provided on the underside thereof, facing the plate 13, with recesses 25 in which the balls 15 are accommodated and which have substantially the same form as the recesses 14 in the plate 13. As will be understood, this embodiment of a locking arrangement according to the invention will automatically lock the spindle 4 against rotation in the strap-unwinding direction in response to both acceleration and retardation forces acting upon the vehicle; in response to excessively high strap acceleration in the unwinding direction; and in response to excessively high strap speed in said unwinding direction. Because, in the function of the locking arrangement, the balls 14 will roll up the sloping sides of both the recesses 14 and the recesses 25, the inertia body 16 will be lifted still further.

In order to prevent the balls 15 from completely leaving the recesses 14 and 25 in the embodiment according to FIGS. 8–10, when the inertia body 16 is located in its maximum lift position, a planar plate 26 is loosely arranged between the plate 13 and the inertia body 16. This plate 26 is provided with through-passing openings in the form of radial slots 27, in which the balls 15 are located. Although the plate 26 will hold the balls 15 in the recesses 14 and 25, it will not prevent the balls from moving radially outwardly under the influence of centrifugal forces, should the shaft 11 with the plate 13 begin to rotate at an excessively high speed.

Figure 11:
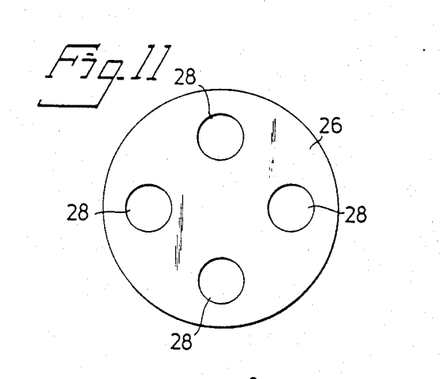
FIG. 11 is a plan view of another embodiment of the ball-holder plate in the locking arrangement illustrated in FIG. 8.

If the embodiment of the locking arrangement according to the invention illustrated in FIGS. 8, 9 is desired not to react at an excessively high strap-unwinding speed, the plate 26 may, instead, have the form illustrated in FIG. 11. In this embodiment the plate 26 is provided with through-passing openings in the form of circular holes 28, in which the balls 15 are located. In this way the plate 26 will hold the balls 15 within the recesses 14 and 25, and prevent, at the same time, the balls 15 from moving radially outwards under the influence of large centrifugal forces. Thus, when provided with a plate 26 designed in accordance with FIG. 11, the embodiment illustrated in FIGS. 8, 9 will function in a similar manner as the previously described embodiment according to FIGS. 3–5. When a plate 26 designed in accordance with FIG. 11 is used, it is possible for the balls 15 to be attached to or formed integrally with the plate 26, instead of being freely rotatable in circular holes 28 in said plate. In this case, the balls will slide along the sloping surfaces of the recesses 14 and 25, instead of rolling therealong.

It will be understood that a locking arrangement according to the invention can be designed in a number of ways which deviate from the aforedescribed embodiments. For example, the means for braking the inertia body 16 against rotation in a direction corresponding to the direction in which the strap is unwound from the spindle 4, when the inertia body 16 is moved laterally under the influence of a large acceleration or retardation force, may have a different form. Similarly, the mechanism for transferring the axial movement of the inertia body 16 to the pawl 8 co-acting with the ratchet wheel 7 may be formed in a number of different ways. This also applies to the locking mechanism formed by the ratchet wheel 7 and pawl 8 of the illustrated embodiment. The number of balls may, of course, be greater or smaller than the number of balls illustrated, i.e. four balls, and should preferably be at least three in order for the inertia body 16 to have a stable position. It will also be understood that the function of the locking arrangement will not change should the various recesses and grooves for the balls 15 change place in the plate 13 and the inertia body 16.

Figure 12:
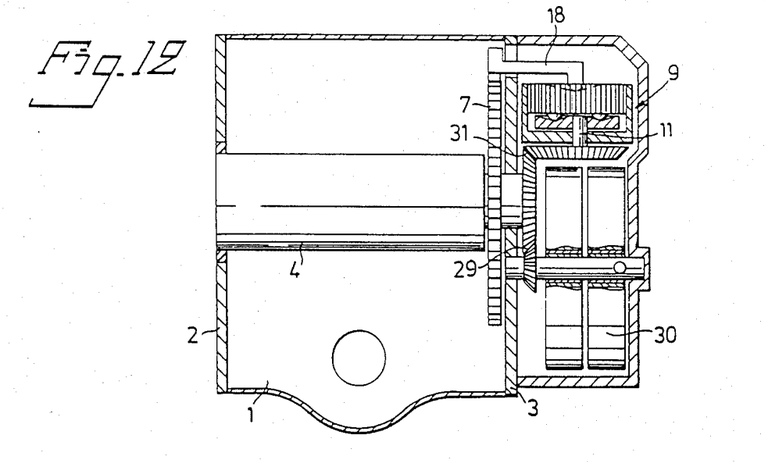
FIG. 12 is a schematic side view, partly in crosssection similar to FIG. 1, of a further embodiment of a winding device provided with a locking arrangement according to the invention.
Figure 13:
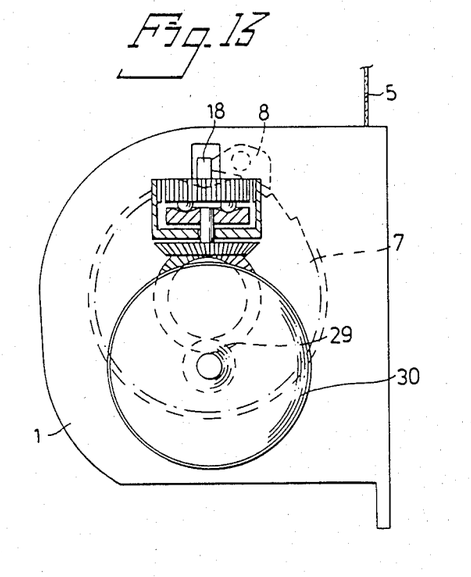
FIG. 13 is an end view, partly in section, of the winding device illustrated in FIG. 12.

FIGS. 12 and 13 illustrate by way of example a further embodiment of a safety-belt winding device provided with a locking arrangement according to the invention. In the illustrated winding device, the spindle 4 is coupled, via a gear means 29, to a winding spring 30 which comprises two coil springs connected in series and which is arranged externally of the same end wall 3 as the locking arrangement 9 according to the invention. The shaft 11 of the locking arrangement is also coupled in this case to the spindle 4 via a mitre-gear 31, which utilizes the same pinion of the shaft of the spindle 4 as the gear 29 for the winding spring 30.

Figure 14:
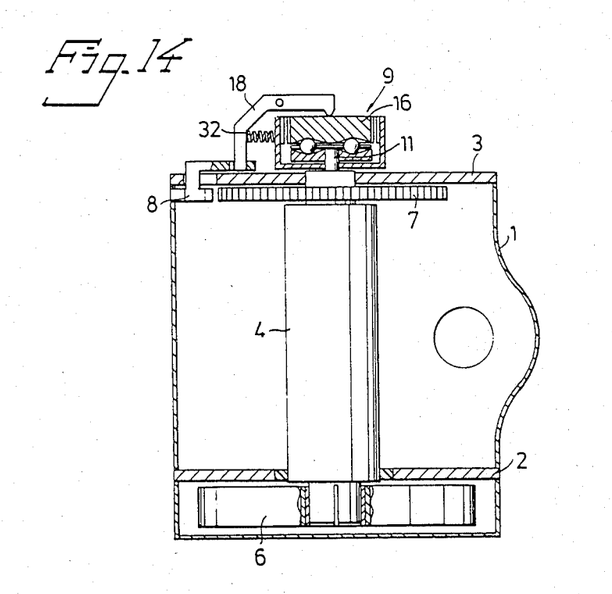
FIG. 14 is a schematic side view, partly in section, of a further embodiment of a winding device provided with a locking means according to the invention.

FIG. 14 illustrates by way of example another embodiment of safety-belt winding device provided with a locking arrangement according to the invention. In this case, the locking arrangement 9 is so arranged on the outside of the end wall 3 that the shaft 11 of the locking arrangement is co-axial with the spindle 4 and connected directly thereto. Further, the pivot arm 18 is acted upon by a spring 32, which is arranged to hold the pivot arm in abutment with the inertia body 16 of the locking arrangement 9.

As will readily be understood from the aforegoing, a locking arrangement according to the invention can be readily adapted to safety-belt winding devices of different kinds, and can be mounted in a number of different ways on said devices. This greatly facilitates the use of a locking arrangement according to the invention, since a high degree of freedom is obtained in the matter of designing the winding device and of mounting the locking arrangement on said device in the manner most suitable with respect to the desired installation of the winding device in a vehicle.

I claim:

1. A locking arrangement for a winding device of a vehicle safety-belt, said winding device including a spindle journalled for rotation in two, mutually opposite directions, a strap which forms a part of said belt, being connected to said spindle and arranged to be wound onto and unwound from said spindle, and spring means coupled to said spindle so as to be tensioned when the spindle rotates in the strap-unwinding direction and to drive the spindle in the opposite direction to wind the strap thereonto, said locking arrangement comprising:
a first body arranged for rotation in two mutually opposite directions around a stationary rotary axis and connected to said spindle so as to rotate about said rotary axis with rotation of the spindle, said first body having a side surface extending at right angles to said rotary axis;
a second, circular-cylindrical body arranged for free movement in all directions relative to said first body and having a side surface located adjacent to and parallel with said side surface of said first body, and subjected to a force acting in a direction towards said first body;
said side surface of one of said bodies being provided with a plurality of recesses which are symmetrically located in relation to the center axis of said surface, each of said recesses having a substantially circular configuration and a depth which decreases gradually in all directions from the center of said recess;
a spherical ball having a diameter exceeding the greatest depth of said recesses being located in each of said recesses;
said side surface of the other one of said bodies being provided with a recess for accommodating a respective one of said balls, said recess being arranged to accommodate part of that portion of the ball protruding beyond said side surface of said one body;
a stationary cylindrical surface coaxially surrounding said moveable, second body at a distance from the cylindrical surface of said body, said stationary cylindrical surface and the cylindrical surface of said moveable body being so arranged that the moveable body is prevented from rotating in a direction corresponding to the direction in which said strap is unwound from said spindle, when said cylindrical surface of the moveable body is brought into contact with said stationary cylindrical surface;

a locking mechanism which can be activated to lock said spindle against rotation in said direction corresponding to the direction in which said strap is unwound; and coupling means operatively coupling said moveable second body to said locking mechanism in a manner activating said locking mechanism when said second body is moved axially through a given shortest distance away from said rotatably journalled first body.

2. A locking arrangement as claimed in claim 1, wherein said recesses in said side surface of said other body have the form of part-shperical hollows having a diameter which substantially corresponds to the diameter of said balls, said hollows being located opposite the deepest part of said recesses in said side surface of said one body.

3. A locking arrangement as claimed in claim 1, wherein said recesses in said side surface of said other body have the form of straight grooves which extend substantially radially outwardly to the outer periphery of said side surface, the inner ends of said grooves being located substantially opposite the deepest part of said recesses in said side surface of said one body.

4. A locking arrangement as claimed in claim 3, wherein said grooves have a constant depth over the whole of their length.

5. A locking arrangement as claimed in claim: 3, wherein said grooves have a depth which decreases gradually in a direction towards the outer periphery of the side surface.

6. A locking arrangement as claimed in claim: 1, wherein said recesses in said side surface of said other body have a form which is substantially similar to said recesses in said side surface of said one body, and are located opposite said last mentioned recesses.

7. A locking arrangement as claimed in claim 6, comprising a plate loosely arranged between said mutually facing side surfaces of said two bodies, said plate being provided with a respective through-passing opening for each of said balls.

8. A locking arrangement as claimed in claim 7, wherein said openings have the form of circular holes, the diameter of which slightly exceeds the diameter of said balls.

9. A locking arrangement as claimed in claim 7, wherein said openings comprise straight slots which extend radially towards the periphery of the plate and the width of which slightly exceeds the diameter of said balls.

10. A locking arrangement as claimed in claim 1, wherein said coupling means include a pivotally mounted arm, one end of which abuts the opposite side surface of said moveable second body and the pivotal movement of which, upon axial displacement of the moveable body away from the rotatably mounted first body, activates said locking mechanism.

11. A locking arrangement as claimed in claim 10, wherein said opposite side surface of said moveable second body is provided centrally thereof with a recess having a depth which decreases gradually in all directions from the center of said side surface, said one end of said pivot arm lying against said side surface within said recess.

12. A locking arrangement as claimed in claim 1, wherein said force acting upon said moveable second body in a direction towards said rotatably mounted first body includes the force exerted by the intrinsic weight of the moveable body.

13. A locking arrangement as claimed in claim 1, wherein said force acting upon said moveable second body in a direction towards said rotatably journalled first body includes the force exerted by a spring means.

14. A locking arrangement as claimed in claim 1, wherein said locking mechanism includes a ratchet wheel, which is connected to said spindle, and a pawl arranged to co-act with said ratchet wheel.

15. A locking arrangement as claimed in claim 1, wherein said rotatably journalled first body is connected to said spindle through a toothed gear.

16. A locking arrangement as claimed in claim 1, wherein the cylindrical surface of said moveable second body and said co-axially surrounding, stationary cylindrical surface are provided with obliquely extending teeth, which upon mutual contact between the two said surfaces prevent rotation of said moveable body in said direction corresponding to the direction in which said strap is unwound from said spindle.

* * * * *